United States Patent

Inami et al.

[11] 3,922,666
[45] Nov. 25, 1975

[54] SIGNAL LEVEL DISPLAYING APPARATUS

[75] Inventors: Mamoru Inami; Yoshiaki Tanaka; Tsuyoshi Ono, all of Yokohama, Japan

[73] Assignee: Victor Company of Japan, Limited, Kanagawa, Japan

[22] Filed: Feb. 19, 1974

[21] Appl. No.: 443,658

[30] Foreign Application Priority Data
Feb. 19, 1973 Japan.............................. 48-19946
May 1, 1973 Japan.............................. 48-47596
May 15, 1973 Japan.............................. 48-53195

[52] U.S. Cl...... 340/324 M; 315/169 R; 324/103 P; 324/122
[51] Int. Cl.$^2$.......................................... G08B 5/36
[58] Field of Search.................. 340/324 R, 324 M; 324/103 P, 122, 140 R, 77 A; 315/132, 133, 169 R

[56] References Cited
UNITED STATES PATENTS

| | | |
|---|---|---|
| 3,328,790 | 6/1967 | Rhodes........................... 340/324 R |
| 3,585,440 | 6/1971 | Lee et al........................ 340/324 A |
| 3,805,036 | 4/1974 | Michaud et al................. 324/103 P |
| 3,810,138 | 5/1974 | Thompson et al.............. 340/324 R |

Primary Examiner—David L. Trafton
Attorney, Agent, or Firm—Holman & Stern

[57] ABSTRACT

A signal level displaying apparatus comprises circuits for carrying out time division of input signals of multiple channels, a plurality of level selection circuits having respectively different threshold values and operating to produce outputs in accordance with the levels of the signals thus time divided, and a display part having level electrode parts which are connected respectively to the level selection circuits and disposed on one display screen, and which cause luminescent display to be carried out in accordance with the outputs of the level selection circuits. This signal level display apparatus further has a circuit part for displaying the real time levels of signals and a circuit part for storing and displaying maximum levels.

3 Claims, 23 Drawing Figures

SIGNAL LEVEL DISPLAYING APPARATUS

BACKGROUND OF THE INVENTION

The present invention relates generally to a signal level displaying apparatus and more particularly to an apparatus for displaying the levels of multichannel signals on one and the same display screen.

With the recent development and spread of four-channel reproducing apparatuses, there has been a need for the realization of an apparatus of simple organization for displaying of the levels of each of the channel signals. Furthermore, in the displaying of the levels of the channel signals, there is also the need for means for displaying not merely the signal levels varying together with the elapse of time but also maximum values (peak values).

Accordingly, the present invention is directed toward the realization of an apparatus capable of displaying the levels of multichannel signals with a single circuit system by time dividing multichannel signals and displaying signal levels on one and the same display screen. In this apparatus, the frequency of the above mentioned time division is selected to be of an order such that the signal level displays of all channels on the display screen appear to the eye as though they are being effected at the same time and continuously.

SUMMARY OF THE INVENTION

It is a general object of the present invention to provide a signal level displaying apparatus capable of accomplishing level display of multichannel signals with one circuit system and on one and the same display screen. By the use of the apparatus of this invention, level display of multichannel signals can be accomplished with a simple circuit organization.

Another object of the invention is to provide a signal level displaying apparatus capable of displaying real time levels (levels varying with the elapse of time) with respect to each channel signal and to memorize and display maximum value levels (maximum or peak level up to the present during the elapse of time) on one and the same display screen.

Still another object of the invention is to provide a signal level displaying apparatus capable of displaying on the same display screen two level values which never assume an oppositely large and small relationship in level, as between VU value and peak value, with respect to the signals of all channels.

A further object of the invention is to provide a signal level displaying apparatus having a luminescent display screen in which is used a plasma display plate, a luminescent diode plate, or the like. By this provision according to the present invention, since indicating pointers and the like are not used, there is no possibility of inaccuracy in reading due to external vibration or to the driving mechanism of the indicating pointer.

Other objects and further features of the invention will be apparent from the following detailed description when read in conjunction with the accompanying drawings.

DETAILED DESCRIPTION

First, the organization and operation of one example of a plasma display plate suitable for application in the display part of the display apparatus of the invention will be described with reference to FIGS. 1, 2A, 2B, and 2C. Two glass plates 11 and 12 are disposed parallelly and spaced apart by a specific distance, and to the mutually opposed surfaces thereof, opposed electrodes 13 and 14 are respectively fixed. These electrodes 13 and 14 are covered respectively by insulating layers 15 and 16. The space between these insulating layers 15 and 16 is filled with a gas mixture 17 containing neon as its predominant constituent and sealed from the outside.

Figures 2A, 2B, 2C:
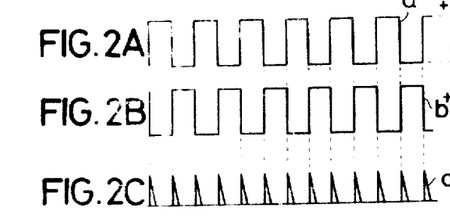
FIGS. 2A, 2B, and 2C are pulse time charts respectively indicating voltages applied to the electrodes of the plasma display plate shown in FIG. 1 and the nature of discharging.

When a display pulse signal $a$ of a repeated rectangular waveform of a voltage V as indicated in FIG. 2A is applied on the electrode 13, and a display pulse signal $b$ of a repeated rectangular waveform of a voltage V as indicated in FIG. 2B is applied to the electrode 14, a discharge current $c$ as indicated in FIG. 2C repeatedly flows by way of the gas mixture layer 17 between the electrodes 13 and 14, and luminescent display is carried out.

Figure 1:
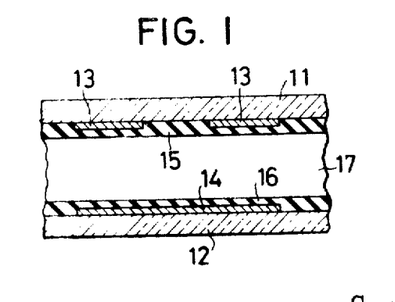
FIG. 1 is fragmentary, simplified, sectional view of one example of a plasma display plate of general type.

In this connection, it is to be noted that, by depositing and forming the electrodes 13 and 14 by printing on the glass plates 11 and 12, a large number of electrodes of multichannels can be fabricated simultaneously with high efficiency.

The circuitry of one embodiment of a signal level displaying apparatus according to the invention will now be described with reference to FIG. 3.

The plasma display section 20 is constituted in the same manner as that described above relative to the principle thereof with reference to FIG. 1 and has a channel electrode group 21 and a level electrode group 22. The channel electrode group 21 comprises first through fourth channel electrodes 23, 24, 25, and 26 corresponding respectively to the input signals of first through fourth channels described hereinafter, while the level electrode group 22 comprises $n$ level electrodes 27-1 through 27-$n$, 28-1 through 28-$n$, 29-1 through 29-$n$, and 30-1 through 30-$n$ respectively facing the channel electrodes 23 through 26. Furthermore, of the level electrodes 27-1 through 30-$n$, level electrodes of the same subscripts "1" through "$n$" are connected commonly to common terminals 31-1 through 31-$n$ with respect to the same subscripts.

A quaternary decoder 32 generates control pulse signals P-1, P-2, P-3, and P-4 for the time division which have low level parts in successively different time zones with each other as indicated in FIGS. 4A through 4D and supplied the same respectively to a channel signal selection circuit 33 and a channel electrode selection circuit 34. The channel signal selection circuit 33 comprises analog switch circuits 35, 36, 37, and 38 to which the input signals S1 through S4 of four channels are respectively and independently supplied. The channel electrode selection circuit 34 comprises full-conducting switch circuits 44, 45, 46, and 47.

The analog switch circuits 35 through 38 of the channel signal selection circuit 33 are rendered conductive only when the control pulse signals supplied from the quaternary decoder 32 are of low level and are held in the nonconductive state when these signals are of other higher levels. Furthermore, since the control pulses P-1 through P-4 have low-level periods in successively different time zones, the analog switch circuits 35 through 38 are rendered conductive successively and periodically. Consequently, the input signals S1 through S4 are successively selected independently and supplied to a level selection circuit 39.

This level selection circuit 39 comprises, essentially, an analog-digital (A-D) conversion circuit 40 and a level electrode selection circuit 42. The A-D conversion circuit 40 comprises $n$ level conversion circuits 41-1 through 41-$n$ in mutually parallel connection. The level electrode selection circuit 42 comprises $n$ full-conducting switch circuits 43-1 through 43-$n$ mutually connected in parallel and in correspondence with level conversion circuits 41-1 through 41-$n$.

Each of the level conversion circuits 41-1 through 41-$n$ comprises essentially an attenuator of resistance division organization and an inverter having a specific threshold value ($V_T$). These level conversion circuits are so adapted that their input-converted threshold values ($V_S$) are mutually different in a stepwise or staggered manner. Accordingly, of these level conversion circuits, those supplied as input with specific channel signals of levels higher than the input-converted threshold value ($V_S$) from the channel signal selection circuit 33 produce, as output, signals of low level, while those supplied as input with specific channel signals of levels lower than the threshold value ($V_S$) produce as output signals of high level.

For example, when a control pulse signal P-1 from the quaternary decoder 32 is supplied to the analog switch circuit 35, a first channel input signal S1 is supplied through the analog switch circuit 35, which has been rendered conductive, to the A-D conversion circuit 40. If, at this time, this signal level is of a value greater than the threshold value ($V_S$) of each of only first, second, and third level conversion circuits 41-1, 41-2, and 41-3, the output signals from these level conversion circuits are of low level, and the output signals of the other level conversion circuits 41-4 through 41-$n$ are of high level.

The full-conducting switch circuits 43-1 through 43-$n$ of the level electrode selection circuit 42 assume their conductive states when the output signals from the level conversion circuits 41-1 through 41-$n$ are of low level. On one hand, display pulses $a$ indicated in FIG. 2A are being supplied from a terminal $Xa$ to the switch circuits 43-1 through 43-$n$ and, passing through those of the switch circuits 43-1 through 43-$n$ which are in conductive state, are supplied to those common terminals of common terminals 31-1 through 31-$n$ of the level electrode group 22 which correspond to the switch circuits in conductive state.

Figure 3:
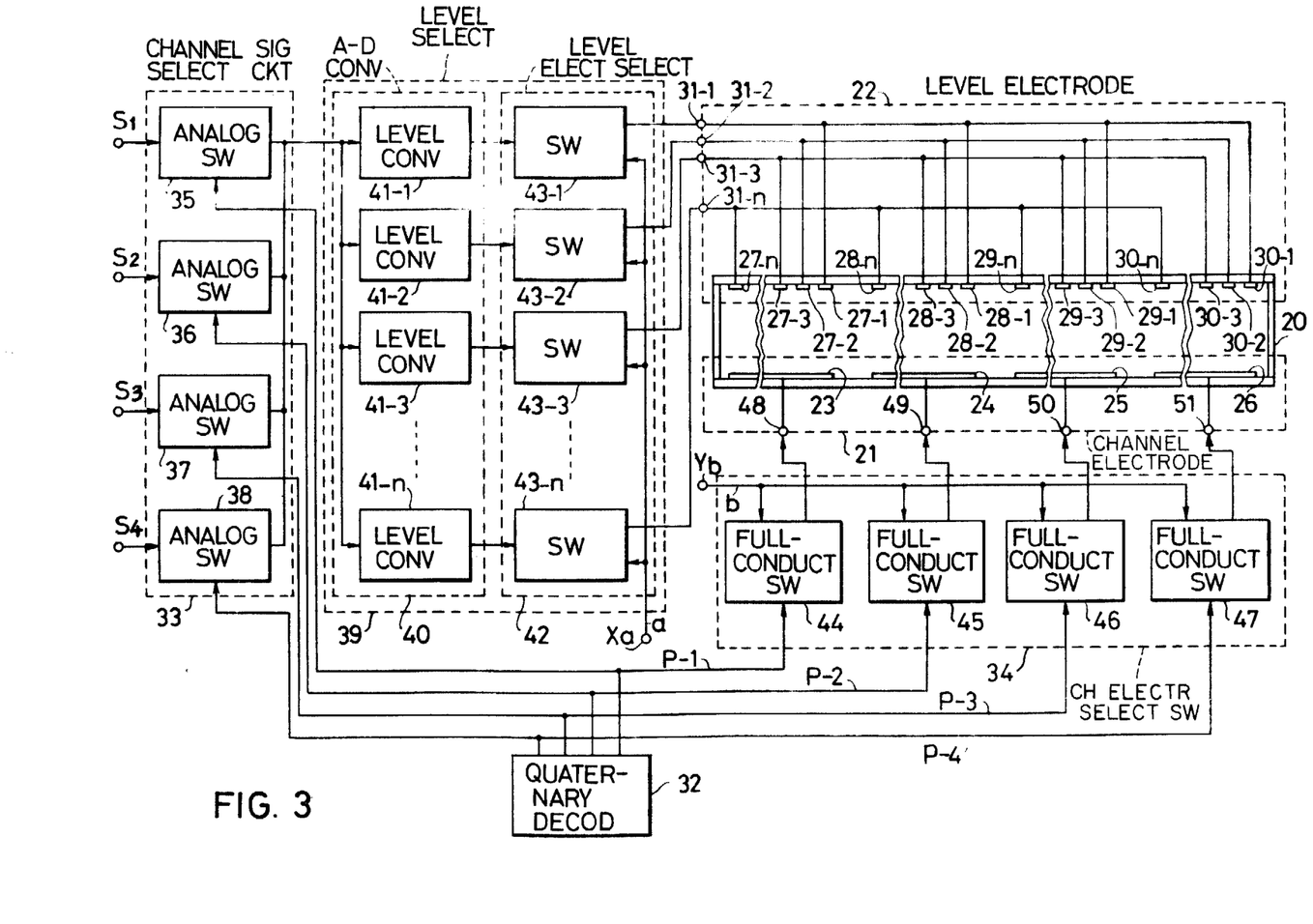
FIG. 3 is a block schematic diagram showing one embodiment of a signal level displaying apparatus according to the invention.
Figures 4A, 4B, 4C, 4D:
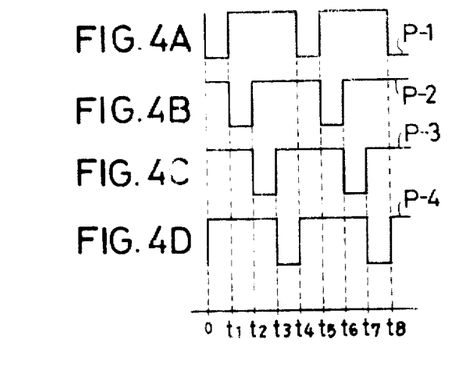
FIGS. 4A through 4D are pulse time charts respectively indicating the waveforms of control pulses for time division.

For example, in the case where, in the time interval of from 0 to t1 indicated in FIG. 4, the signals of low level are led out of only the first, second, and third level conversion circuits 41-1, 41-2, and 41-3 of the A-D conversion circuit 40 as described above, only the full-conducting switch circuits 43-1, 43-2, and 43-3 corresponding respectively to these conversion circuits are rendered conductive. Consequently, the display pulse signal $a$ indicated in FIG. 2A is supplied to the common terminals 31-1, 31-2, and 31-3 and is further applied to level electrodes 27-1 through 27-3, 28-1 through 28-3, 29-1 through 29-3, and 30-1 through 30-3.

On one hand, the control pulses P-1, P-2, P-3, and P-4 indicated in FIGS. 4A through 4D from the quaternary decoder 32 are supplied respectively to full-conducting switch circuits 44, 45, 46, and 47 constituting the channel electrode selection circuit 34. The full-conducting switch circuits 44 through 47 are supplied respectively with the control pulses P-1 through P-4 as mentioned above and, at the same time, are being supplied with display pulses $b$ of which phases are opposite to those of the display pulses $a$ as indicated in FIG. 2B from an input terminal $Yb$. These full-conducting switch circuits 44 through 47 are changed into their conductive states to produce display pulses $b$ as output when control pulses of low level are applied thereto. These output display pulses $b$ from the full-conducting switch circuits 44 through 47 are respectively applied to input terminals 48 through 51 of the channel electrode group 21 and further applied to the channel electrodes 23 through 26.

In the case where, of the full-conducting switch circuits 44 through 47, only the full-conducting switch circuit 44 is supplied, in the time interval from 0 to t1, with the control pulse signal P-1 of low level as indicated in FIG. 4A and is changed to the conductive state, the display pulse signal $b$ indicated in FIG. 2B is applied by way of the terminal 48 to only channel electrode 23. Accordingly, in the time interval from 0 to t1, the display pulse signal $a$ is applied to the level electrodes 27-1 through 27-3, 28-1 through 28-3, 29-1 through 28-3, and 30-1 through 30-3 with respect to the level electrode group 22, while the display pulse signal b is applied to only the channel electrode 23 with respect to the channel electrode group 21. As a consequence, discharging occurs between the channel electrode 23 and the electrodes 27-1, 27-2, and 27-3 among the opposed electrodes to which the display pulse signal a is applied, and the designated level of the first channel signal S1 is luminescently displayed at the display part of the first channel.

While the above description has been presented with respect to the level display of the first channel signal S1, level display operations of the other channel signals also are successively carried out independently by channel since the channel signal selection circuit 33 and the channel electrode selection circuit 34 possess time division function as a result of the output signal of the quaternary decoder 32. Detail description of these operations will be omitted.

By presetting the period of repetition of the control pulse signals at, for example, 33 mili-sec. or less at the time of carrying out successively and independently level display operations of the channel signals by the pulse period of the output signal from the quaternary decoder 32, it is possible to see by eye the level display operation due to plasma discharge at the display parts corresponding to the four-channel signals S1 through S4 as though it were continuous and intermittent as a visual sensation.

Specific embodiments of circuits for the blocks in the block circuit diagram illustrated in FIG. 3 will now be described with reference to FIGS. 5, 6, and 7.

Figure 5:
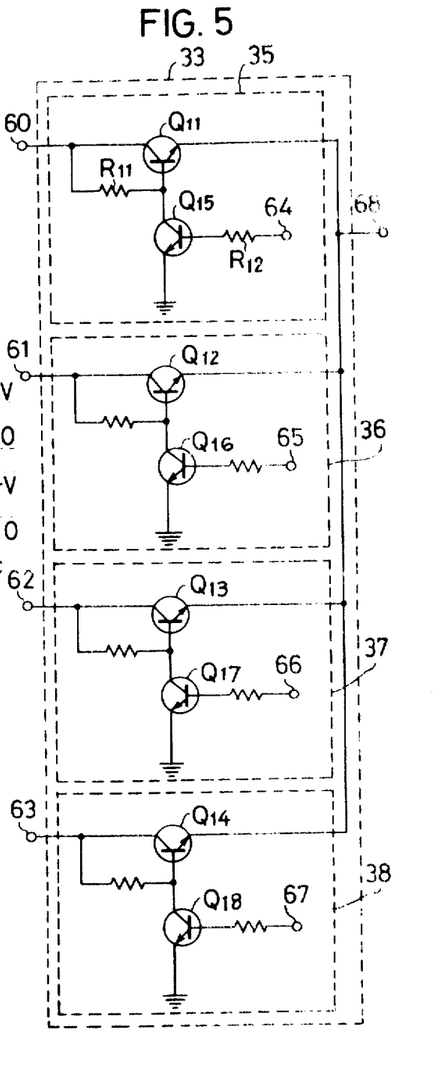
FIG. 5 is a circuit diagram of one embodiment of a specific circuit arrangement of a channel signal selection circuit in the apparatus shown in FIG. 3.

FIG. 5 shows the circuit of one embodiment of analog switch circuits 35 through 38 constituting the channel signal selection circuit 33. In FIG. 5, parts corresponding to blocks shown in FIG. 3 are enclosed within intermittent lines and designated by the same reference numerals. Input terminals 60, 61, 62, and 63 of the analog switch circuits 35 through 38 are supplied independently with normal four channel input signals S1 through S4. Input terminals 64, 65, 66, and 67 are respectively supplied independently with control pulse signals P-1 through P-4 indicated in FIGS. 4A through 4D from the quaternary decoder 32. A common output terminal 68 is connected commonly to the emitters of transistors Q11 through Q14.

The analog switch circuits 35 through 38 have identical circuit organizations. The organization and operation of the analog switch circuit 35 will herein be described. When, while the first channel input signal S1 is being applied to the input terminal 60, the control pulse signal P-1 of low level is applied to the input terminal 64, a switching transistor Q15 is rendered nonconductive, and the base of the transistor Q11 is placed in a non-grounded state. Furthermore, the first channel input signal S1 is applied by way of a resistor R11 to the base of this transistor Q11, which is thereby rendered conductive. As a consequence, the first channel input signal S1 applied to the input terminal 60 passes between the collector and emitter of the transistor Q11 in conductive state and is led out through the common output terminal 68.

In the time interval from t1 to t4 after the elapse of the time from 0 to t1, the control pulse signal P-1 applied to the input terminal 64 is of a high level, whereby the transistor Q15 is rendered conductive. Consequently, the transistor Q11 is changed over to the non-conductive state since its base is grounded, and an output signal corresponding to the first channel input signal S1 is no longer produced from the output terminal 53.

On one hand, the low-level part of the control pulse signals P-1 through P-4 are successively staggered in time as indicated in FIGS. 4A through 4D and respectively exist at 0 to t1, t1 to t2, t2 to t3, t3 to t4, ....... For this reason, switching transistors Q15 through Q18 provided in the analog switch circuits 35 through 38 are changed over in succession to their inoperative states with respectively different time zones, and, accordingly, the transistors Q11 through Q14 are successively and independently rendered conductive.

Accordingly, from the common output terminal 68, a single input signal of the first to fourth channel input signals S1 through S4 is led out independently and successively for each different time zone.

Figure 6:
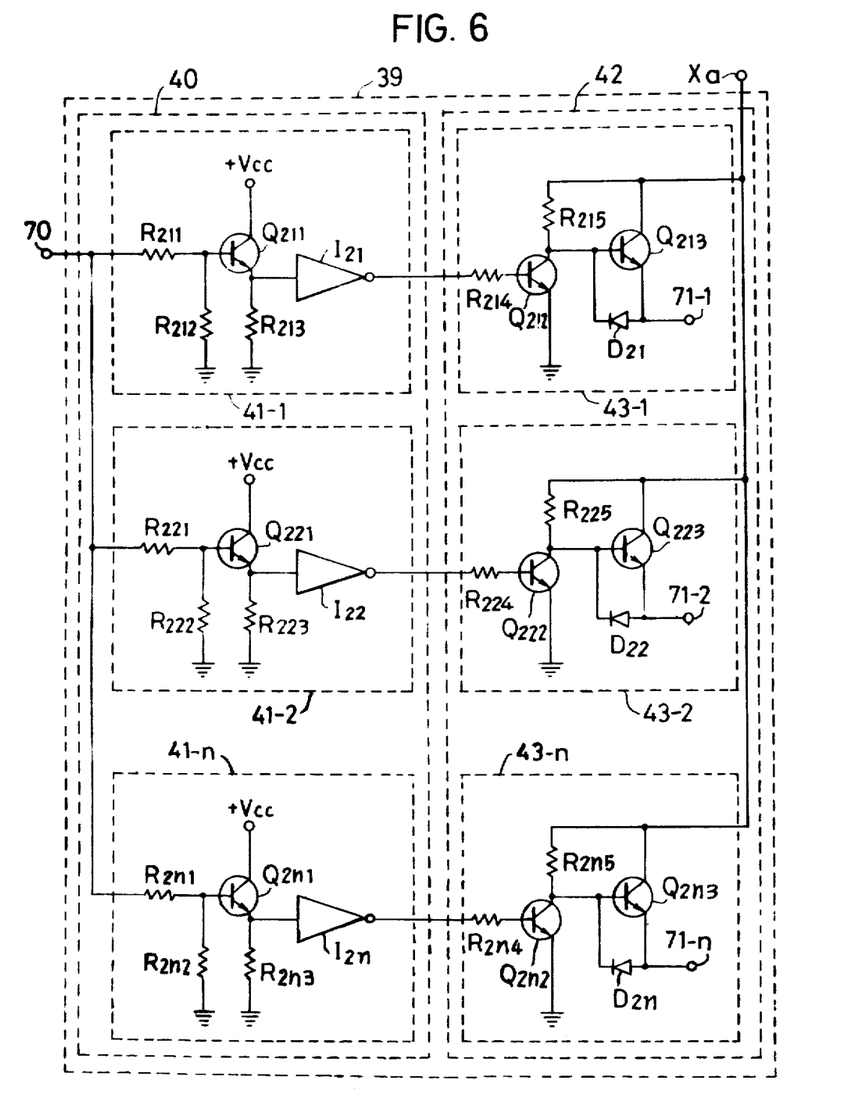
FIG. 6 is a circuit diagram of one embodiment of a specific circuit arrangement of a level selection circuit in the apparatus illustrated in FIG. 3.
Figure 7:
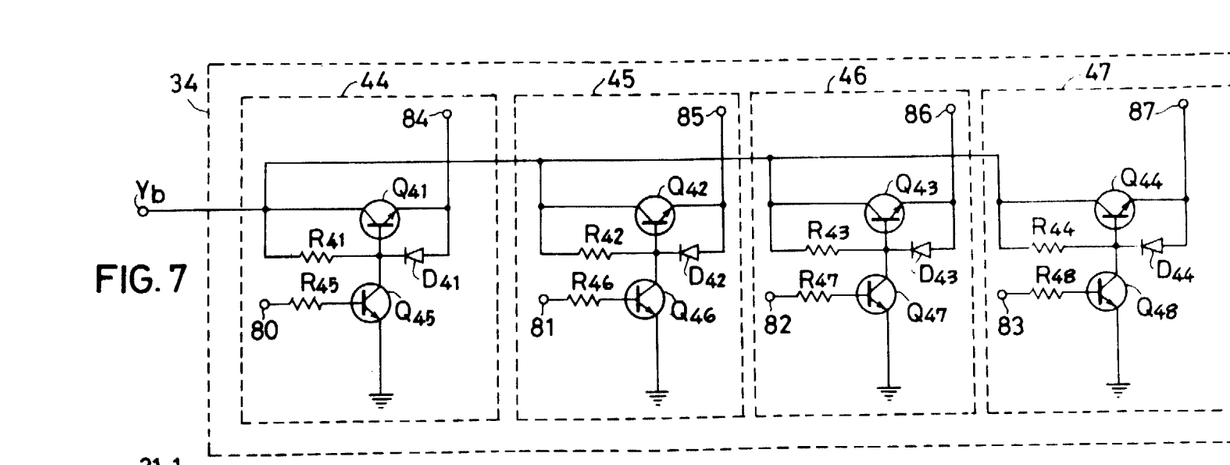
FIG. 7 is a circuit diagram of one embodiment of a specific circuit organization of a channel electrode circuit in the display apparatus of the invention.

A specific embodiment of circuit arrangements of level conversion circuits 41-1 through 41-n of the A-D conversion circuit 40 and full-conducting switch circuits 43-1 through 43-n of the level electrode selection circuit 42 constituting the level selection circuit 39 is illustrated in FIG. 6. The level conversion circuits 41-1 through 41-n and the full-conducting switch circuits 43-1 through 43-n are respectively similarly organized and, moreover, mutually and independently form pairs. Hereinafter, the circuit organization and operation principally of the first level conversion circuit 41-1 and the full-conducting switch circuit 43-1 forming a pair therewith will be described, beginning with the first level conversion circuit 41-1.

The output signal from the common output terminal 68 of the channel signal selection circuit 33 indicated in FIG. 5 is applied to a common input terminal 70 and is further applied by way of a resistor R211 to the base of a transistor Q211. Between the base of the transistor Q211 and ground, there is connected a bias resistor R212. The collector side of the transistor Q211 is connected to a DC power source +Vcc, while the emitter side is grounded through a resistor R213 and, at the same time, is connected to the input side of an inverter I21.

In this connection, the input-converted threshold voltage ($V_S$) of the first level conversion circuit 41-1 of the above described organization can be expressed by the following equation.

$$V_S = \frac{R211 + R212}{R212} (V_{T1} + V_{BE1}),$$

Where: $V_{T1}$ is the threshold value of the inverter I21; and $V_{BE1}$ is the voltage between the base and emitter of the transistor Q211.

In the above equation, since the value $V_{T1}$ and $V_{BE1}$ may be considered to be constants, it is possible to preset at a specific level the threshold value ($V_S$) of the first level conversion circuit 41-1 by appropriately selecting the value of the resistors R211 and R212. Similarly, with respect to the second level conversion circuit 41-2 through the n-th level conversion circuit 41-n, also, the threshold values ($V_{S2}$ through $V_{Sn}$) thereof can be respectively preset at specific, stepwisely differing values by selecting the ratios of the resistance values of resistors R221 and R222, ....... R2n-1 and R2n2, and so forth at respectively individual values.

Accordingly, when an analog signal of a specific level applied to the common input terminal 70 is supplied simultaneously to the first level conversion circuit 41-1 through the $n$-th level conversion circuit 41-$n$, the inverters I21 through I2$n$ produce output signals of low level in the case where input voltages higher than their respective threshold values $V_{T1}$ through $V_{Tn}$ are being applied respectively thereto and produce output signals of high level in the case where the input signal lower than these threshold values are being applied thereto.

The circuit organization and operation of the first full-conducting switch circuit 43-1 forming a pair with the first level conversion circuit 41-1 will now be described. A switching transistor Q212 is supplied at its base with the output of the inverter I21 transmitted through a resistor R214 and is rendered non-conductive when this output signal of the inverter I21 is of low level and conductive when this output is of high level.

The display pulse $a$ as indicated in FIG. 2A is applied to a terminal X$a$, which is a common input terminal for all full-conducting switch circuits 43-1 through 43-$n$. Then, in the time zone wherein the level of the display pulse signal $a$ is zero volt, a transistor Q213 between its base and collector and a diode D21 become conductive respectively in their forward directions, and the transistor Q213 assumes its conductive state. Consequently, in the case where the output signal of the inverter I21 is at a low level, the circuit between the input terminal X$a$ and an output terminal 71-1 of the first full-conducting switch circuit 43-1 becomes "full-conducting" and not "semi-conducting", and the display pulses $a$ are led out through the output terminal 71-1.

On one hand, in the case where the output signal from the inverter I21 is at a high level, the switching transistor Q212 is rendered conductive, and the base of the transistor Q213 is grounded. For this reason, even when the display pulse signal $a$ is being applied to the input terminal X$a$, the collector and emitter of the transistor Q213 are in a mutually cut-off state, and the display pulse signal $a$ is no longer conducted to the output terminal 71-1.

The above described operation is exactly the same as those of the second full-conducting switch circuit 43-2 through the $n$-th full-conducting switch circuit 43-$n$. When the output signals from inverters I22 through I2$n$ are at low level, and switching transistors Q222 through Q2$n$2 are held in their non-conductive states, the display pulse signal $a$ applied to the common input terminal X$a$ is conducted through the transistors Q223 through Q2$n$3 in conductive state and is led out through the output terminals 71-1 through 71-$n$.

Next, the circuit organization and operation of specific embodiment of circuits of full-conducting switch circuits 44 through 47 of the channel electrode selection circuit 34 will be described with reference to FIG. 7. These full-conducting switch circuits 44 through 47 are generally of the same arrangement as the above described full-conducting switch circuits 43-1 through 43-$n$. These circuits 44 through 47 have a common input terminal Y$b$, to which the display pulse signal $b$ indicated in FIG. 2B is applied, and have respective input terminals 80 through 83, to which control pulses P-1 through P-4 as indicated in FIGS. 4A through 4D from the quaternary decoder 32 are independently applied.

These full-conducting switch circuits 44 through 47 respectively have output terminals 84 through 87 connected respectively to the emitter sides of transistors Q41 through Q44 and correspond to the input terminals 48 through 51 of the channel electrode group 21. Switching transistors Q45 through Q48 become non-conductive when the control pulses P-1 through P-4 imparted to the input terminals 80 through 83, respectively, are of low level and become conductive when these pulses are at high level. The transistors Q41 through Q44 are respectively changed over to the conductive state when the switching transistors Q45 through Q48 are rendered non-conductive, whereby the display pulse signal $b$ applied to the common input terminal Y$b$ is conducted to each of the output terminals 84 through 87.

For example, in the time interval from 0 to t1 in FIG. 4, only the control pulse signal P-1 applied to the input terminal 80 is at a low level, and the control pulse signals P-2 through P-4 applied to the other input terminals 81 through 83 are of high level. As a consequence, of the switching transistors Q45 through Q48, only the transistor Q45 becomes non-conductive. Therefore, of the transistors Q41 through Q44, only the transistor Q41 of the full-conducting switch circuit 44 is rendered conductive, whereby the display pulse signal $b$ introduced through the input terminal Y$b$ is conducted to the output terminal 84.

It is to be observed in this connection that, since the control pulse signals P-1 through P-4 have low-level periods in successively different time zones as indicated in FIGS. 4A through 4D, the channel electrode selection circuit 34 carries out time division operation. The terminals 84 through 87 are respectively connected to the terminals 48 through 51 in FIG. 3.

Figure 8:
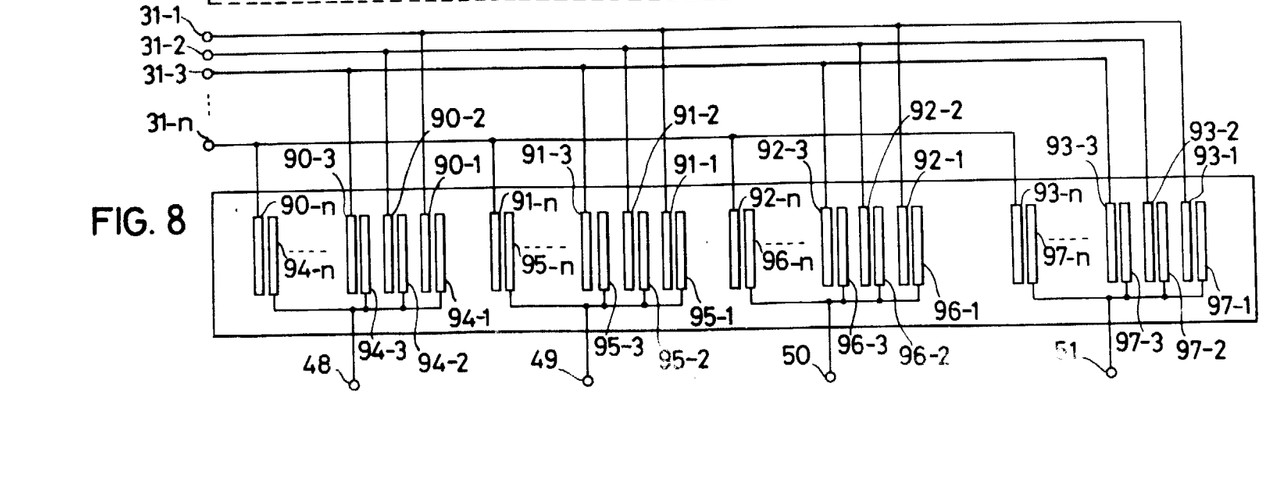
FIG. 8 is an outline schematic diagram for a description of another example of a display part suitable for use in the display apparatus of the invention.

Another example of a display device suitable for use as the display part 20, as illustrated in FIG. 8, is arranged as a display device of surface discharge type. First level electrodes 90-1, 90-2, ...... 90-$n$ correspond to the level electrodes 27-1, 27-2, ...... 27-$n$ for the first channel signals in FIG. 3. Similarly, second level electrodes 91-1 through 91-$n$, third level electrodes 92-1 through 92-$n$, and fourth level electrodes 93-1 through 93-$n$ correspond respectively to the level electrodes 28-1 through 28-$n$, 29-1 through 29-$n$, and 30-1 through 30-$n$ in FIG. 3.

Furthermore, first channel electrodes 94-1, 94-2, ......94-$n$ are respectively confronting the first level electrodes 90-1, 90-2, .... 90-$n$ and correspond to the first channel electrode 23 in FIG. 3. Similarly, second channel electrodes 95-1 through 95-$n$, third channel electrodes 96-1 through 96-$n$, and fourth channel electrodes 97-1 through 97-$n$ are positioned opposite to the second level electrodes 91-1 through 91-$n$, the third level electrodes 92-1 through 92-$n$, and the fourth level electrodes 93-1 through 93-$n$, respectively, and respectively correspond to the second channel electrode 24, the third channel electrode 25, and the fourth channel electrode 26 in FIG. 3.

Accordingly, in the display device illustrated in FIG. 8, also, discharging operation is accomplished upon arrival of each channel signal in accordance with the level of that signal between the channel electrode and the opposite level electrode.

Furthermore, in the display devices shown in FIGS. 3 and 8, the level electrode group is commonly connected outside of the display plate, but it is also possible to connect these electrodes commonly on the display plate by a technique such as printing.

While the above described embodiment is adapted to accomplish level display selectively relative to signals of four channels, the number of signal channels can be selected at will by correspondingly increasing or decreasing the number of circuits.

By the use of a device as described above, the input signal of multiple channels such as four-channel audio signals can be successively processed with a single system circuit thereby to accomplish level display in a time-divisional manner independently by channels on the same display plate. This feature leads to other advantages such as the following. The entire apparatus can be constituted in a relatively simple manner. Furthermore, since the levels of respective channel signals are repeatedly displayed in cyclic periods of very short time respectively for the various parts of the display part having the same surface, the display of the levels of all channel signals can be simultaneously viewed, and, moreover, since the display is of electrical type wherein electric discharge is utilized, the response time can be made very short, and energy losses can be held to a minimum.

Figure 9A:
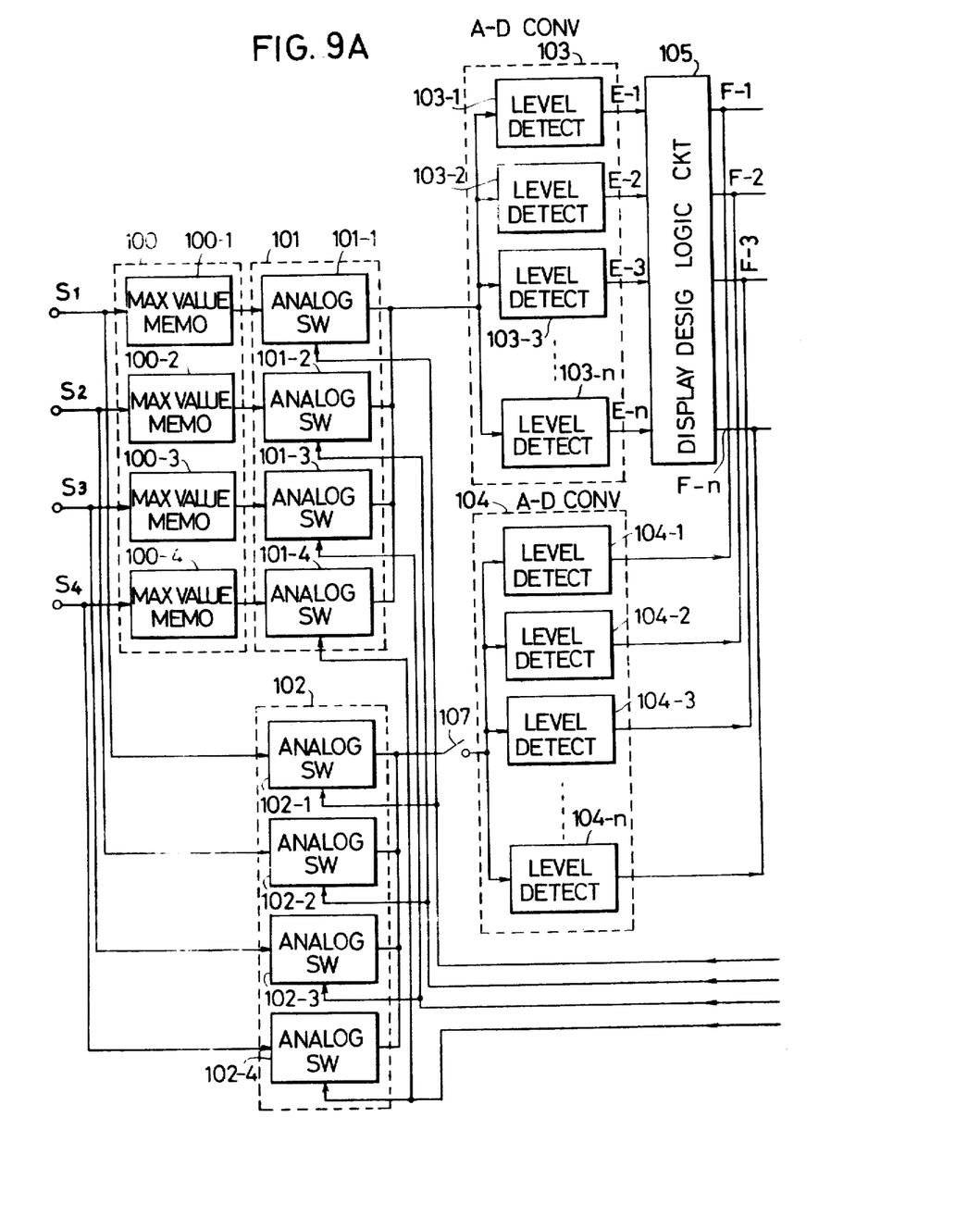
FIGS. 9A and 9B are respectively block schematic diagrams showing another embodiment of a signal level displaying apparatus according to the invention.
Figure 9B:
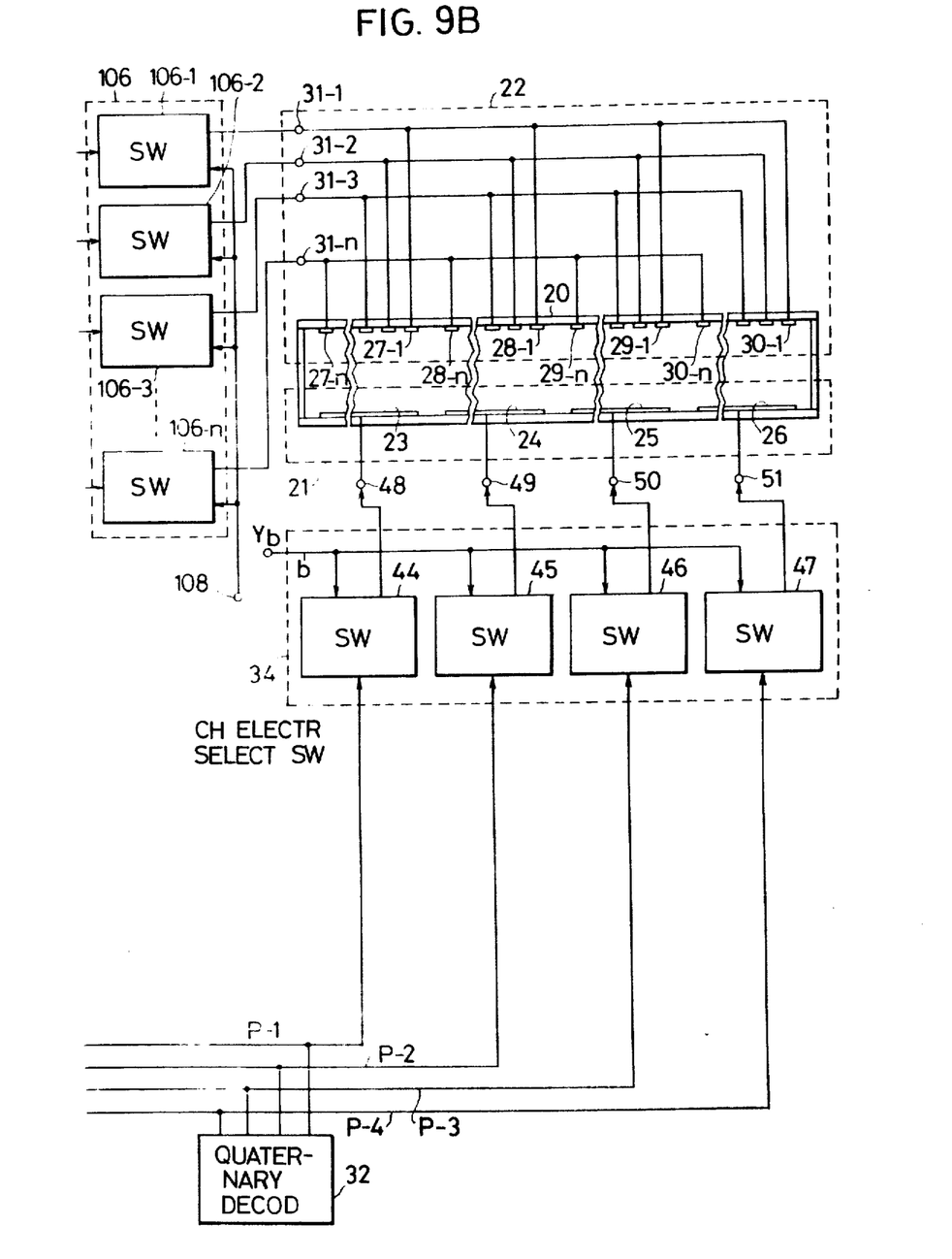

Next, one embodiment of a level displaying apparatus capable of selectively carrying out displaying of the real time level of each channel signal and the memorized maximum level value on one kind of level pattern simultaneously or either one thereof will be described. FIGS. 9A and 9B show the entire block system of this apparatus, in which parts which are the same as those in FIG. 3 are designated by like reference numerals. Detailed description of these parts is omitted hereinafter.

In the apparatus illustrated in FIGS. 9A and 9B, the first through fourth signals S1 through S4 are supplied to a maximum value memorizing and displaying system and a real time displaying system. In the maximum value memorizing and displaying system, the channel signals are respectively supplied to maximum value memorizing circuits 100-1 through 100-4 (100) provided respectively for respective channels and memorized their maximum values thereat. The outputs of the maximum value memorizing circuits 100-1 through 100-4 are respectively supplied to analog switching circuits 101-1 through 101-4 (101) and time divided thereat by control pulses from the quaternary decoder 32. The time divided outputs of the analog switching circuits 101 are supplied to an analog-digital (A-D) conversion circuit 103 comprising n level detecting circuits 103-1 through 103-n of which outputs are supplied to a display designating logical circuit 105. The output of the circuit 105 is supplied to a full-conducting switching circuit 106 which comprises n full-conducting switches 106-1 through 106-n and is applied with a display pulse a from a terminal 108. The output of the circuit 106 is supplied to the level electrode group 22 of the plasma display section 20.

On one hand, in the real time displaying system, the channel signals S1 through S4 are supplied to analog switch circuits 102-1 through 102-4 (102) provided respectively for the four channels and are there time divided in response to the control pulses from the quaternary decoder 32 in synchronism with the operation of the analog switch circuits 101-1 through 101-4. The outputs of the analog switch circuits 102-1 through 102-4 are supplied by way of a real time switch 107 to an A-D conversion circuit 104 comprising n level detection circuits 104-1 through 104-n. The output of the A-D conversion circuit 104 is supplied to the above mentioned full-conducting switch circuit 106. The switch 107, in the case where real time level displaying is not carried out, is opened with a manually operated switch which is closed at the time real time level displaying is carried out.

Figure 10:
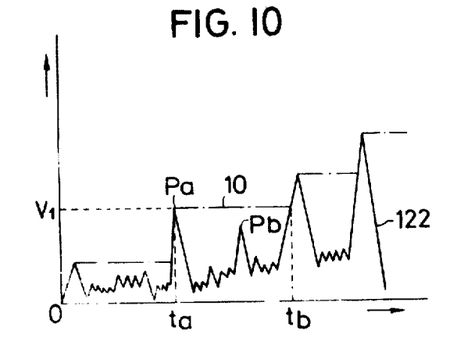
FIG. 10 is a waveform graph indicating a real time signal and maximum peak voltages to be memorized.
Figure 11:
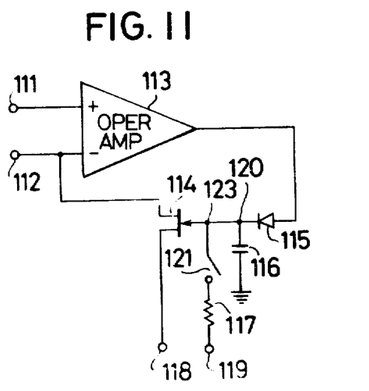
FIG. 11 is a circuit diagram of one embodiment of a specific circuit organization of a maximum value memory circuit in the apparatus shown in FIG. 9A.

In the circuit of the above described organization, the operation of the maximum value memorizing and displaying system is as follows. As indicated in FIG. 10, each of the input channel signals is supplied to the maximum value memorizing circuit 100. A circuit diagram of one embodiment of a specific circuit organization of this maximum value memorizing circuit 100 is shown in FIG. 11, in which an operational amplifier 113 is used as a voltage follower, and in the feedback loop of this circuit, there is inserted an analog memory circuit.

More specifically, the output side of the operational amplifier 113 is connected by way of a forward direction diode 115 and junctions 120 and 123 to a gate of a field effect transistor (FET) 114 employed as a high input resistance element. Furthermore, the junction 120 is grounded through a capacitor 116, and the junction 123 is connected by way of a memory switch 121 comprising an ON-OFF switch and a resistor 117 to a negative power supply terminal 119. In addition, the drain of the above mentioned FET transistor 114 is connected to a positive power supply terminal 118, and the source thereof is connected to an output terminal 112 of the operational amplifier 113.

In the case where the memory switch 121 is being opened, only the maximum peak voltage within the specified time of an input signal supplied through an input terminal 111 passes through the diode 115, whereby a capacitor 116 is charged. As a result, at the output terminal 112, only the maximum peak voltage of the input signals is produced. For example, within the specified time zone $ta$ through $tb$ of an input signal 122 as indicated in FIG. 10, only the maximum peak voltage V1 at the time of the maximum value $Pa$ of the specified time zone is produced at the output terminal 112, and a peak voltage of other peak values $Pb$, etc., is not produced at the output terminal 112.

Then, when the memory switch 121 is closed, the accumulated charge in the capacitor 116 passes through the resistor 117 and flows through a negative power supply terminal 119, and the discharging is completed in a short time with a time constant determined by the capacitor 116 and the resistor 117, whereby the memorized voltage is no longer produced as output from the output terminal 112. The discharge time can be shortened by selecting the resistor 117 at a low value and connecting the negative power supply. The forward direction of the diode 115 has the functional effect of passing only the maximum peak voltage of an input signal, and, moreover, the reverse direction of the diode 115 and the FET 114 have the functional effect of preventing leakage of the accumulated charge in the capacitor 116.

A specific circuit organization of the A-D conversion circuits 103 and 104 is, for example, the same as that of the A-D conversion circuit 40 shown in FIG. 6.

Figure 12:
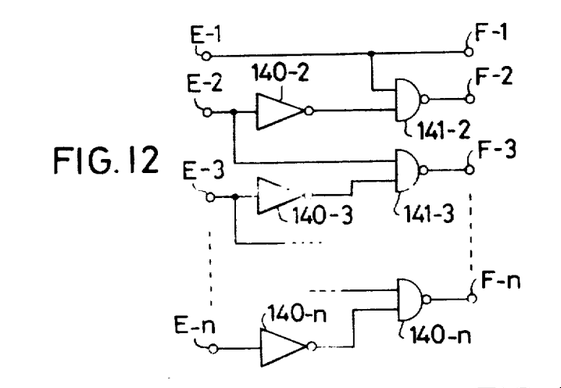
FIG. 12 is a circuit diagram of one embodiment of a specific circuit organization of a display designating logical circuit in the apparatus illustrated in FIG. 9A.

The display designation logical circuit 105 comprises inverters 140 and NAND circuits 141 as shown by one embodiment circuit diagram thereof in FIG. 12. The output terminals F-1 through F-n of n level detection circuits respectively have independent connection arrangements in correspondence to input terminals E-1 through E-n of the display designation logical circuit 105. The signal levels at these input terminals E-1 through E-*n* are so set that they become successively higher from the input terminal E-*n* toward the input terminal E-1. For this reason, of the output terminals F-1 through F-*n*, only that output terminal corresponding to the maximum level of the input signal levels becomes of low level, while the others all become of high level. That is, only when the two input signals of the NAND circuit are both of high level, the output signals of the NAND circuit become of low level.

It will now be assumed that the maximum level of the input signals is supplied to the input terminal E-3. Then, the input signal from the input terminal E-2 of the NAND circuit 141-3 is of high level, and the input signal from the inverter 140-3 is also of high level. Accordingly, only the output terminal F-3 of the NAND circuit 141-3 becomes of low level, and the other output terminals all become of high level. The output signals at the output terminals F-1 through F-*n* of this display designation logical circuit 105 is supplied to all input terminals of the full-conducting switch circuit 106.

Figure 13:
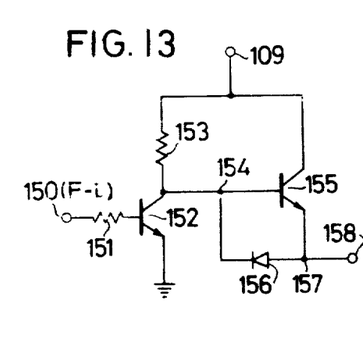
FIG. 13 is a circuit diagram of one embodiment of a specific circuit organization of a full-conducting switch circuit in the apparatus shown in FIG. 9B.

A specific circuit diagram of one embodiment of one switch of the n full-conducting switches 106-1 through **106-*n* constituting the full-conducting switch circuit 106 is shown in FIG. 13. In this circuit diagram, the input terminal 150** (F-*i*) corresponds to the *i*-th output terminal (F-*i*) of the display designation logical circuit 105. This input terminal 150 is connected through a resistor 151 to the base of a transistor 152. The collector of this transistor 152 is connected by way of a resistor 153 to the input terminal 108 and, at the same time, is connected by way of a junction 154 also to the base of a transistor 155. The emitter of the transistor 152 is grounded. The collector of the transistor 155 is connected to the input terminal 108, and the emitter of this transistor 155 is connected by way of a junction 157 and a diode 156 to the junction 154, the forward direction of the diode 156 being from the junction 157 toward the junction 154. The junction 157 is further connected to an output terminal 158.

When the input terminal 150 is at a low level, the display pulses of positive-phase sequence continually applied to the input terminal 108 passes through the transistor 155, since the transistor 152 is in non-conductive state, and is conducted to the output terminal 158. On the other hand, when the input signal at the input terminal 150 is of high level, the transistor 152 becomes conductive, and the collector thereof assumes substantially the ground (earth) level, whereby the positive-phase-sequence pulses are not conducted to the output terminal 158.

Accordingly, the positive-phase-sequence pulses are conducted to the output terminal 158 and are applied to the level electrode 22 of the plasma display plate 20 shown in FIG. 9B only when the input signal at the input terminal 150 is at a low level. On the other hand, when the input signal at the input terminal 150 is of high level, the positive-phase-sequence display pulses are not conducted as far as the output terminal 158. Consequently, these pulses are not applied to the level electrode 22 of the plasma display plate 20.

The operation of the real time displaying system is as follows. In the real time displaying system, as indicated in FIG. 9A, the input signal is selected by the opening and closing of the real time switch 107. The A-D conversion circuit 104 comprises n level detection circuit 104-1 through **104-*n***, and the outputs of the level detection circuits receiving input signals of high levels become of low level, while the outputs of the other level detection circuits all become of high level. This output signal level is transmitted respectively to the input terminals F-1 through F-*n* of the full-conducting switch circuit 106. The operation thereafter is similar to the operation in the maximum value memorizing and displaying system. Therefore, description of this operation will be omitted.

Accordingly, the level display apparatus of the invention possesses the following displaying features. (1.) When the memory switch 121 is open (OFF), it is possible by closing the real time switch 107 (ON) to display only the maximum value memory level of the same input signal and, moreover, to display the real time level simultaneously on the same level pattern of the plasma display plate with a display below the specified level. (2.) When, with the memory switch 121 in the opened (OFF) state, the real time switch 107 is opened (OFF), only the maximum value memory level is displayed. (3.) When, with the memory switch 121 in the closed (ON) state, the real time switch 107 is closed (ON), only the real time level is displayed at a level below the designated level.

Figure 14:
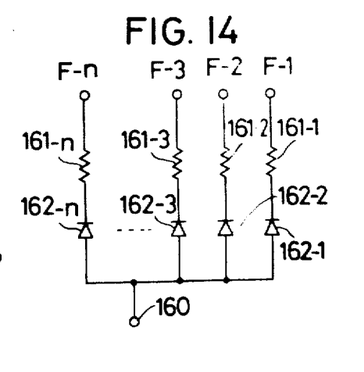
FIG. 14 is a circuit diagram of one embodiment of a specific circuit organization of a luminescent diode display plate suitable for use in place of a plasma display plate.

Instead of the full-conducting switch circuit 106 and the plasma display plate 20, the luminescent diode display plate shown in FIG. 14 may be used. In the circuit shown in FIG. 14, a power supply terminal 160 is connected to a positive power supply and is connected commonly to luminescent diodes 162-1 through **162-*n*, which are respectively connected by way of luminescing current adjusting resistors 161-1 through 161-*n*** to input terminals F-1 through F-*n* corresponding respectively to the output terminals of the display designation logical circuit 105.

By the use of an apparatus as described above in conjunction with FIGS. 9 through 14, it is possible to display luminescently a signal level (real time level) which fluctuates continually with the elapse of time, this signal level being thus displayed in synchronism with the fluctuation thereof. Furthermore, maximum value level memorizing and displaying in which the maximum value of the real time level is memorized and constantly displayed until a signal of a level higher than this maximum value arrives can be carried out.

By single-level displaying a memorized maximum peak voltage and taking the real time level display to be a display of less than the peak voltage, displaying of the differing pattern thereof can be accomplished, whereby distinguishing is facilitated. Furthermore, in the case where this apparatus is used for audio signal recording, it is useful in establishing the sound recording standard level by detection of the maximum peak voltage within the specified time, and, moreover, it is possible by real time level displaying to watch with the real time the state of level fluctuation at the time of sound recording.

An embodiment of an apparatus according to the invention for displaying the levels of signals which are not continually inverted in high and low signal relationship, as in the case of peak values and VU values of the same signal is now be described with reference to FIG. 15. Parts in FIG. 15 which are the same as those in FIG. 9 are designated respectively by like reference numerals and will not be described in detail again.

First through fourth channel signals arrive and enter the circuit through input terminals 170-1 through 170-4. The subscripts *a* and *b* appended to the reference numerals of the input terminals respectively designate the input terminals of the peak value signal and the VU value signal of the same channel. The peak values and the VU values of the channel signals which have entered through the input terminals 170-1a through 170-4b are respectively supplied to analog switch circuits 171-1a through 171-4b. These analog switch circuits 171-1a through 171-4b time divide the arriving signals as a result of control pulses for time division from an octonary decoder 172, and the resulting output are sent to the A-D conversion circuit 103 where they are converted into digital signal and, at the same time, level detected in a stepwise manner.

Octonary digital pulses which have been converted by the A-D conversion circuit 103 are supplied respectively to the display designation logical circuit 105, whereupon at the output terminals of this circuit 105, only the peak level of a single channel signal, for example, is produced as output with a low level, while at the other output terminals digital pulses of high level are sent out as outputs.

The operations of the full-conducting switch circuit 106 and the display plate 20 are similar to those in the embodiment illustrated in FIG. 9.

Embodiments of displays produced by a display plate will now be described.

Figure 16:
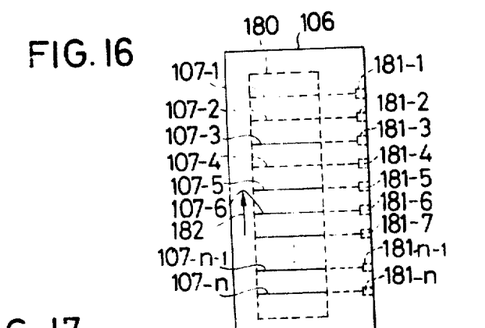
FIG. 16 is a front view of one embodiment of a level display screen.

An embodiment of a display plate of the apparatus for carrying out maximum level value memorizing and displaying and real time level displaying described in conjunction with FIGS. 9 through 14 is illustrated in FIG. 16. On a display screen 180 of the display plate 106, n level electrodes 107-1, 107-2, ..... 107-n are arranged in a row with suitable spacing therebetween. These level electrodes 107-1 through 107-n are respectively connected by way of terminals 181-1 through 181-n to the full-conducting switches 105-1 through 105-n. In the vicinity of the display screen 180, there is provided a level direction index 182 for indicating that the level is greater in the arrow direction.

In the illustrated embodiment, the level electrode 107-3 luminesces to display the memorized maximum level value. This level electrode 107-3 continues its luminescent display until a signal of a maximum level value which exceeds the first mentioned maximum level value arrives, at which time, the level electrode 107-3 stops luminescing. Thereupon, the level electrode (for example, 107-2) on the side of higher level luminesces to effect displaying. The level electrodes 107-5 through 107-n are luminescing to display real time levels. The level electrodes which carry out this real time level display vary between luminescing and not luminescing with the variation of input signal level occuring with the elapse of time.

Accordingly, by observing luminescent display of the plurality of level electrodes luminescing on the display screen 180 from the side of electrode 107-n of low level toward the side of high level, the real time level can be determined. Furthermore, by observing the level electrode display undergoing fixed luminescing for a relatively long time separated in the direction of higher level, the maximum level value can be determined. Of the level electrodes 107-1 through 107-n, the full line parts indicate luminescent parts, while the broken line parts indicate parts which have not yet luminesced.

Figure 15:
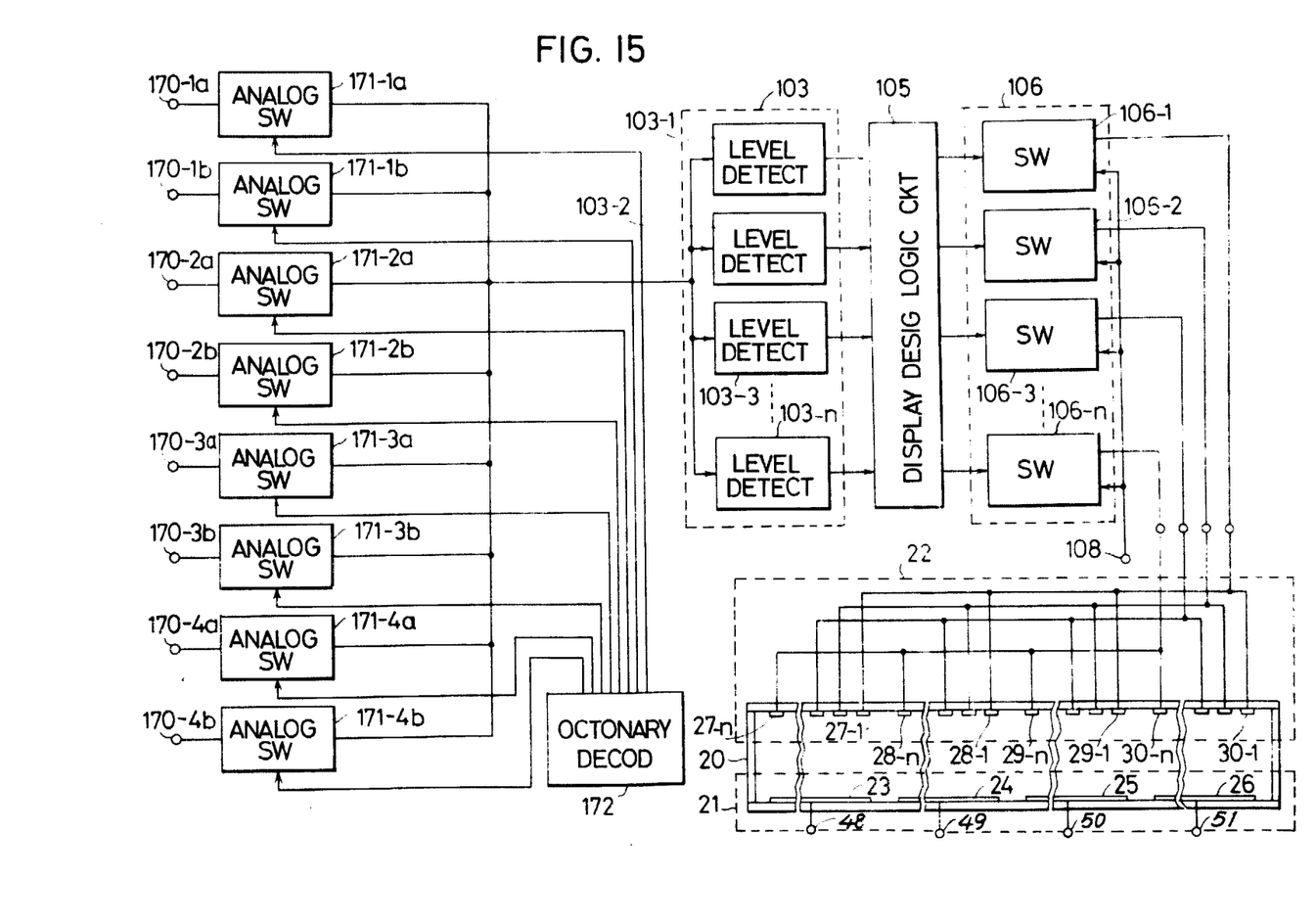
FIG. 15 is a block schematic diagram showing still another embodiment of a signal level displaying apparatus according to the invention.

In the display plate shown in FIG. 16 in the case of a display plate of the apparatus described in conjunction with FIG. 15, only one level electrode 107-3, for example, luminesces to display a signal peak level value, and only one level electrode 107-5 luminesces to display a VU value.

Figure 17:
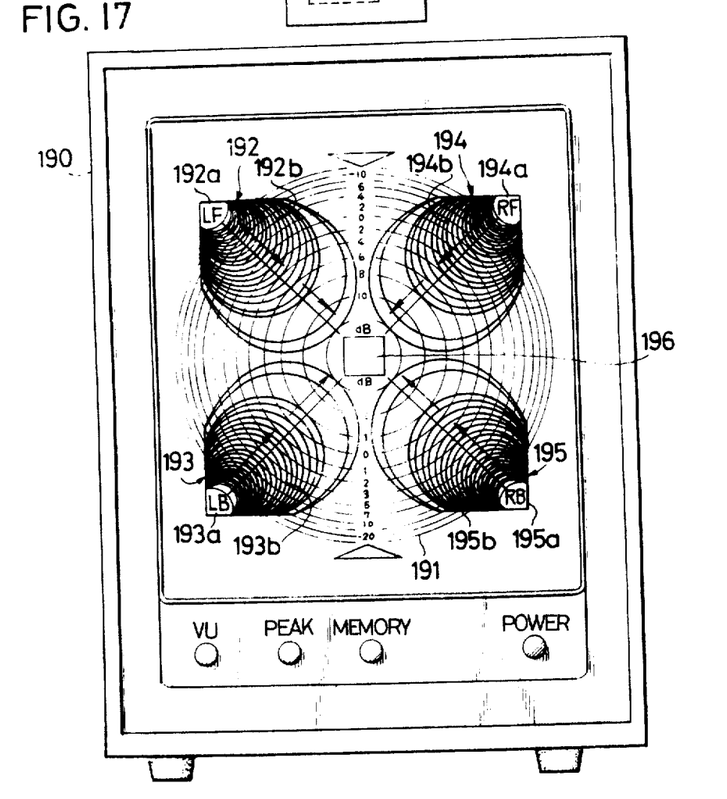
FIG. 17 is a front view of the display screen of one embodiment of the signal level displaying apparatus.

A front view of an actual apparatus for carrying out the above described memorized maximum level value display and real time level display for signals of four channels is shown in FIG. 17. In this apparatus, a display screen 191 is provided on the front face of the signal level displaying apparatus 190. The display screen 191 is provided with a first (left front) channel display part 192, a second (left rear) channel display part 193, a third (right front) channel display part 194, and a fourth (right rear) channel display part 195. These display parts 192 through 195 are provided with a plurality of level electrodes 192b through 195b from their base parts (principal parts) 192a through 195a substantially in a radial form toward the central part 196 of the display screen.

Of the level electrodes 192b through 195b, the level electrodes within the range indicated by arrows in two directions luminesce to display real time level variation, while the level electrodes within the range indicated by either directional arrow successively move and luminesce to display memorized maximum level.

Further, this invention is not limited to these embodiments but various variations and modifications may be made without departing from the scope and spirit of the invention.

What is claimed is:
1. A signal level displaying apparatus comprising:
plasma display means having a plurality of channel electrode parts provided respectively for channels to be level-displayed, a plurality of level electrode parts disposed respectively in correspondence to said channel electrode parts, a glass enclosure accommodating said channel electrode parts and said level electrode parts, and a gas mixture filled in said glass enclosure, each of said level electrode parts comprising a plurality of level electrodes disposed in order of the signal level of the corresponding channel;
first display pulse supplying means for supplying a first display pulse signal to be applied to the level electrode parts of said plasma display means;
second display pulse supplying means for supplying a second display pulse signal to be applied to the channel electrode parts of said plasma means, the polarity of the second display pulse signal being opposite to the polarity of the first display pulse signal;
control pulse supplying means for supplying control pulse signals for time division;
channel signal time division means for time-dividing a plurality of input channel signals in accordance with the control pulse signals from said control pulse supplying means thereby to pass selectively channel signals with time-division time zones which differ successively;
a plurality of level selection circuit means each having successively differing threshold values, each of said level selection circuit means responsive to the output signal of said channel signal time division means for producing a low voltage signal when the level of the output signal of said channel signal time division means is higher than its own threshold value and for producing a high voltage signal when the signal of the output signal of said channel signal time division means is lower than its own threshold value;
a plurality of level electrode selection circuit means respectively connected to the corresponding level selection circuit means, the outputs of said level electrode selection circuit means being respectively connected to the corresponding level electrodes of the level electrode parts, each of the level electrode selection circuit means supplying the first display pulse signal from said first display pulse supplying means to the corresponding level electrodes in response to said low voltage signal and suppressing the first display pulse signal in response to said high voltage signal; and channel electrode selection means operating in accordance with the control pulse signals from said control pulse supplying means to time-divide the second display pulse signal from said second display supplying means in synchronism with said channel signal time division means and to supply the resulting time divided pulses with successively differing time division zones to all of said channel electrode parts of said plasma display means.

2. The signal level displaying apparatus as claimed in claim 1 in which said control pulse supplying means comprises a quaternary decoder which produces as an output four kinds of control pulses having parts of different levels in successively differing time zones; and in which the input channel signals entering said channel signal time division means comprise four-channel signals; and in which said channel electrode parts of said plasma display means comprise electrode parts for four channels disposed with specific relationships respectively for the four channels.

3. A signal level displaying apparatus comprising:

plasma display means having a plurality of channel electrode parts provided respectively for channels to be level-displayed, a plurality of level electrode parts disposed respectively in correspondence to said channel electrode parts, a glass enclosure accommodating said channel electrode parts and said level electrode parts, and a gas mixture filled in said glass enclosure, each of said level electrode parts comprising a plurality of level electrodes disposed in order of the signal level of the corresponding channel;

first display pulse supplying means for supplying a first display pulse signal to be applied to the level electrode parts of said plasma display means;

second display pulse supplying means for supplying a second display pulse signal to be applied to the channel electrode parts of said plasma display means, the polarity of the second pulse signal being opposite to the polarity of the first pulse signal;

control pulse supplying means for supplying control pulse signals for time division;

first channel signal time division means for time-dividing a plurality of input channel signals in accordance with the control pulse signals from said control pulse supplying means thereby to pass selectively channel signals with the time-division time zones which differ successively;

a plurality of first level selection circuit means each having successively differing threshold values, each of said first level selection circuit means responsive to the output signal of said first channel signal time division means for producing a low voltage signal when the level of the output signal of said first channel signal time division means is higher than its own threshold value and for producing a high voltage signal when the level of the output signal of said first channel signal time division means is lower than its own threshold value;

a plurality of memorizing means for respectively memorizing the maximum value of the level of a corresponding input channel signal;

second channel signal time division means for time-dividing the output signals of said memorizing means in accordance with the control pulse signals from said control pulse supplying means thereby to pass selectively the output signals of said memorizing means with time-division time zones which differ successively;

a plurality of second level selection circuit means each having successively differing threshold values, each of said second level selection circuit means responsive to the output signal of said second signal time division means for producing a low voltage signal when the level of the output signal of said second channel signal time division means is higher than its own threshold value and for producing a high voltage signal when the level of the output signal of said second channel signal time division means is lower than its own threshold value;

display designation logic circuit means comprising a plurality of input terminals, each of which receives the output signal of a corresponding second level selection circuit means, a plurality of inverter means for respectively inverting the signal from the corresponding input terminal, and a plurality of NAND circuit means for respectively producing a NAND product of the output signal of the corresponding inverter means and the signal from the input terminal which receives the output signal of the second level selection circuit means having the adjacently lower threshold value than the threshold value of the corresponding second level circuit means, and a plurality of output terminals for respectively receiving the output signal of the corresponding NAND circuit means;

a plurality of level electrode selection circuit means respectively connected to the corresponding first level selection circuit means and the corresponding output terminal of said display designation logic circuit means, the outputs of said level electrode selection circuit means being respectively connected to the corresponding level electrodes of said level electrode parts, each of the level electrode selection circuit means for supplying the first display pulse signal from said first display pulse supplying means to the corresponding level electrodes in response to said low voltage signal and for suppressing the first display pulse signal in response to said high voltage signal; and channel electrode selection means operating in accordance with the control pulse signals from said control pulse supplying means to time-divide the second display pulse signal from said second display pulse supplying means in synchronism with the first and second channel signal time division means and to supply the resulting time-divided pulses with successively differing time division zones to all of the channel electrode parts of said plasma display means.

* * * * *